(12) United States Patent
Frerking et al.

(10) Patent No.: US 8,606,333 B2
(45) Date of Patent: Dec. 10, 2013

(54) PUSH TO LOWER HEARING ASSISTED DEVICE

(75) Inventors: Melvin Duane Frerking, Norcross, GA (US); George O'Quinn Hirvela, Carrollton, GA (US)

(73) Assignee: AT&T Mobility II LLC, Atlanta, GA (US)

(*) Notice: Subject to any disclaimer, the term of this patent is extended or adjusted under 35 U.S.C. 154(b) by 1652 days.

(21) Appl. No.: 11/450,243

(22) Filed: Jun. 8, 2006

(65) Prior Publication Data

US 2007/0009125 A1    Jan. 11, 2007

Related U.S. Application Data

(60) Provisional application No. 60/689,187, filed on Jun. 10, 2005.

(51) Int. Cl.
*H04M 1/00* (2006.01)
(52) U.S. Cl.
USPC ............. 455/569.1; 455/557; 455/575.2
(58) Field of Classification Search
USPC .............................................. 455/569.1, 570
See application file for complete search history.

(56) References Cited

U.S. PATENT DOCUMENTS

| | | | | |
|---|---|---|---|---|
| 4,396,806 | A * | 8/1983 | Anderson | 381/103 |
| 5,963,136 | A * | 10/1999 | O'Brien | 340/573.1 |
| 6,009,469 | A * | 12/1999 | Mattaway et al. | 709/227 |
| 6,122,500 | A * | 9/2000 | Dent et al. | 455/414.1 |
| 6,256,476 | B1 * | 7/2001 | Beamish et al. | 340/7.36 |
| 6,424,234 | B1 | 7/2002 | Stevenson | |
| 7,053,764 | B2 * | 5/2006 | Stilp | 340/506 |
| 7,110,792 | B2 * | 9/2006 | Rosenberg | 455/558 |
| 7,414,534 | B1 * | 8/2008 | Kroll et al. | 340/573.1 |
| 7,714,728 | B2 * | 5/2010 | Koblasz | 340/573.1 |
| 2002/0115426 | A1 * | 8/2002 | Olson et al. | 455/410 |
| 2002/0197992 | A1 * | 12/2002 | Nizri et al. | 455/435 |
| 2004/0204038 | A1 * | 10/2004 | Suzuki et al. | 455/553.1 |
| 2005/0006466 | A1 * | 1/2005 | Overhultz et al. | 235/383 |

* cited by examiner

*Primary Examiner* — Kwasi Karikari
(74) *Attorney, Agent, or Firm* — Woodcock Washburn LLP

(57) ABSTRACT

A mechanism for switching a wireless device between normal operation and a lower-power mode is provided. A wireless device has a selection mechanism for reducing the power output of the wireless device. The wireless device then returns to a normal operation mode upon user release of the selection mechanism.

17 Claims, 2 Drawing Sheets

PUSH TO LOWER HEARING ASSISTED DEVICE

CROSS REFERENCE TO RELATED APPLICATION

This application claims priority under 35 U.S.C. §119(e) from U.S. Provisional Application Ser. No. 60/689,187, filed Jun. 10, 2005. The above-listed U.S. provisional application is incorporated by reference herein, in its entirety, for all purposes.

TECHNICAL FIELD

Embodiments of the present invention are related generally to wireless devices. More particularly, such embodiments relate to power level switching for a wireless device operated by a hearing impaired user.

BACKGROUND OF THE INVENTION

Wireless devices, such as cellular telephones, have become widely used in daily life. As wireless devices are increasingly used for business, personal and emergency communication, it is becoming more and more important that wireless devices be made available for use by people who have physical or other limitations. In addition, the Federal Communications Commission (FCC) has mandated that cellular telephone service providers must begin providing cellular telephones that can be used by the hearing impaired.

A conventional, unmodified cellular telephone has shortcomings when used by a person wearing a hearing aid. The cellular signal that is generated by the telephone during a telephone call is received as input by the hearing aid, which then converts the signal into noise. The hearing aid user may detect this noise and, as a result, the signal quality of the call is degraded.

A conventional solution to this problem involves the uses of a Subscriber Identity Module (SIM) card that is configured to operate in place of a user's hearing aid. For example, a SIM card is configured with a user's hearing aid prescription so the user does not have to wear his or her hearing aid during a conversation, thereby eliminating any chance of hearing aid interference. A drawback of this conventional solution is that the SIM card is specifically tailored to the user's hearing aid prescription for a particular ear (i.e., the hearing aid in the left or right ear). If the user switches ears while using the cellular telephone, and has a different prescription for that ear, the SIM card may not be set properly. Thus, upon switching ears the user may notice that the volume level of the telephone is too low or too high. An additional drawback of this solution is that anyone other than the user for which the SIM is configured would likely encounter the same problem. To achieve normal volume levels on such a cellular telephone, a user would have to replace the SIM card with another SIM card that is not configured with the hearing aid prescription. This process is complicated and time-consuming for the average cellular telephone user. An additional drawback is the inconvenience and social awkwardness of requiring a user to remove his or her hearing aid prior to using the cellular telephone.

Another solution may involve reducing the power output of a wireless device to reduce the resulting interference with a hearing aid. However, simply manufacturing a wireless device, such as a telephone, having a permanently reduced power output can reduce the device's coverage area and signal quality because less power is available to transmit the user's signal. The issues of reduced coverage area and signal quality are particularly pronounced when the telephone is used for emergency purposes (e.g., to dial 911), where the greatest signal strength would typically be desired to ensure that the emergency call is successfully completed.

A solution may be to switch the wireless device into and out of the reduced power mode as needed. However, switching the device may not be a simple process for an average user, as several steps may need to be taken to effectuate the switch. A typical switching process may require a user to set the reduced power preference prior to making a call, or even more difficult, prior to answering an incoming call. A user may also have to program the device to enter a desired mode upon start up. If the device's start up mode is not the desired mode for a particular call, the user will have to switch modes again. The repetitive switching between modes can become tedious for the user. In addition, a user who is under the stress of an emergency situation may not be able to recall the proper method of switching power modes prior to placing an emergency call when full power may be desirable or alternatively, in such an emergency wherein reduced power is not a concern, but rather interference reduced operation is desirable.

An additional shortcoming is that the user may simply switch the device to the reduced power mode and leave it there unnecessarily, which may become a problem in the event that an emergency call needs to be made or should other users use the device. Furthermore, extended use in the reduced power mode may cause the user (or other users) to form an unfavorable opinion of the coverage area provided by a cellular service provider because of the gaps in coverage that may arise while the device is operating in the reduced power mode. In other words, the user may not realize that the gaps are due to the reduced power output of his or her device, rather than an actual coverage problem caused by the provider.

Accordingly, there is a need for a mechanism that enables simplified activation and deactivation of a reduced power mode in a wireless device that also minimizes unnecessary time spent in the reduced power mode. The present invention satisfies this need.

SUMMARY

In view of the above noted shortcomings and drawbacks, a mechanism for switching a wireless device between normal operation and a lower-power mode is provided. According to one embodiment, a wireless device may have a selection mechanism for reducing the power output of the wireless device in what is referred to as a Hearing Aid Compatible (HAC) mode. The wireless device may then provide for a return to a normal operation mode upon user release of the selection mechanism.

DETAILED DESCRIPTION OF ILLUSTRATIVE EMBODIMENTS

The subject matter of the various embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In the discussion that follows, details relating to wireless device manufacturing and cellular networks are assumed to be known to those skilled in the art. Accordingly, such details are largely omitted herein for the sake of clarity and explanation. In addition, an example embodiment involving a cellular telephone is used herein solely for purposes of explanation, and is not intended to limit the invention to any such embodiment. For example, a wireless device as contemplated by various embodiments of the invention may include, but are not limited to: cellular telephones, personal digital assistants (PDAs), email devices and the like. The wireless device may operate in a cellular, SMR, PCS, cordless, unlicensed AWS, 700 MHz, or other spectrums. Furthermore, the invention is not limited by the network servicing the device. Accordingly, the invention may be applicable to any network type including, for example, TDMA, CDMA, WCDMA, GSM, WiFi, WiMAX, OFDM, UMTS, EV-DO, HSDPA/HSUPA and other standards now known or to be developed in the future.

One embodiment permits a user to cause a wireless device to enter a low-power mode, herein referred to as a Hearing Aid Compatible (HAC) mode, to avoid interference with a hearing aid or other type of aural assistance device. The embodiment also provides the user with a mechanism for conveniently and efficiently switching back to a normal operation mode to enable the full communication ability of the wireless device. It will be appreciated that the coverage area enabled by such a device may be reduced when the device is operating in the low-power mode. Thus, a quick resumption of normal operation may restore full capabilities to the wireless device.

Figure 1:
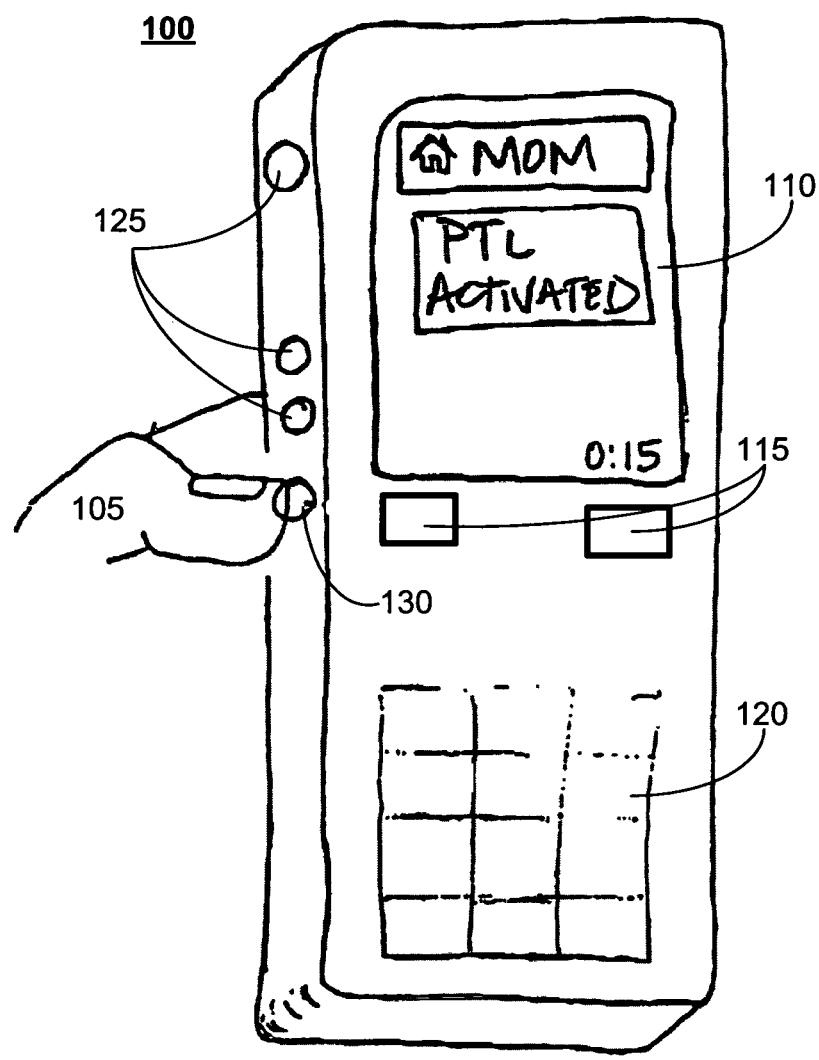
FIG. 1 is a diagram illustrating an example wireless device according to one embodiment of the present invention.

Turning now to FIG. 1, wireless device 100 is depicted as a cellular telephone. As was noted above, a cellular telephone is merely representative of the many types of wireless devices 100 that may be used in connection with an embodiment. Wireless device 100 may have a display 110 for visually presenting information to user 105. Display 110 may be any type of electrical display such as, for example, an LCD, touch-sensitive screen or the like. Softkeys 115 are generally known in the art and are mechanically-operated keys that may be used to select items presented on display 110, thereby enabling softkeys 115 to potentially represent a number of different options. The use of softkeys 115 may reduce the number of physical buttons that need to be present on device 100.

Touch pad 120 may be used to enter telephone numbers, names, addresses, messages and so forth. In some embodiments, touch pad 120 may be a QWERTY-style keyboard, a pad adapted to interact with a stylus, etc. Side buttons 125 may be present on device 100 to enable easy control of certain functions during use of device 100. For example, volume keys may be implemented as side buttons 125 to enable easy access during a conversation.

In the embodiment illustrated in FIG. 1, HAC mode button 130 is implemented as another side button 125. HAC mode button 130 is also depicted as a physical button, but in an alternate embodiment HAC mode button 130 may be implemented as a softkey, such as softkey 115, a part of a touch-sensitive display 110, a slide switch, thumb wheel, a selectable on-screen object, a voice-activated mechanism, as a Radio Frequency Identification (RFID) tag reader or the like. It will be appreciated, therefore, that HAC mode button 130 may be any type of selection mechanism employed by wireless device 100. Also, the location of HAC mode button 130 is depicted on the side of device 100 purely for purposes of explanation, as HAC mode button 130 may be located anywhere on device 100, if button 130 is in fact implemented as a physical button.

HAC mode button 130, when selected, causes wireless device 100 to enter a HAC mode (i.e., lower power mode as compared to a normal operation mode) to reduce possible interference with a hearing aid or other type of aural assistance device. The power transmission capability of wireless device may therefore be lowered to a predetermined threshold. The threshold may, in some embodiments, be adjustable by user 105 according to user's 105 hearing aid prescription, personal preference, etc. In an alternate embodiment, the threshold may be predetermined by the manufacturer to reduce interference with a certain percentage of hearing aid devices so user 105 may not need to configure wireless device 100 to his or her hearing aid prescription. In yet another alternate embodiment, the threshold may be determined on a case-by-case basis, such as using the RFID tags discussed in connection with FIG. 2, below. In a further alternate embodiment wherein HAC mode button 130 is a thumb wheel, a user may use the thumb wheel to raise or lower the RF power of wireless device 100 to a level that is comfortable for the user. Such an adjustment may be made on a per-call basis, or may be stored for use as a default value in future calls, subject to further adjustments by the user.

Figure 2:
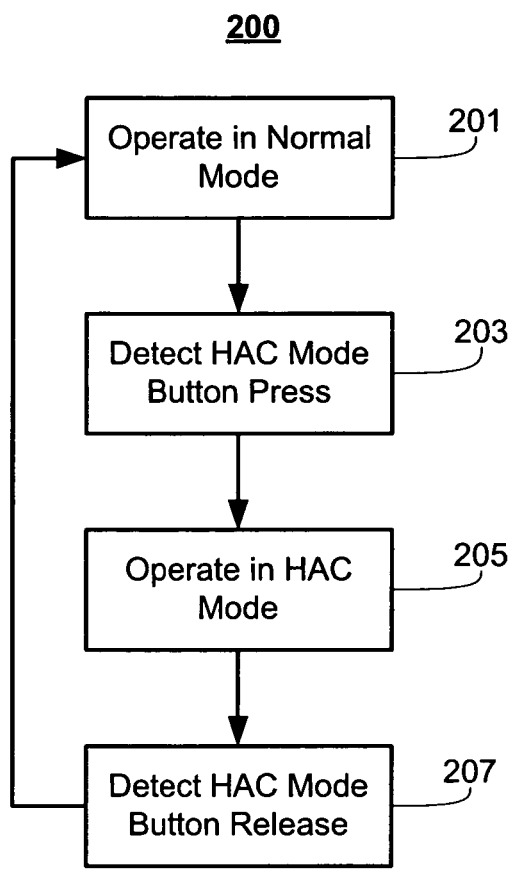
FIG. 2 is a flowchart illustrating an example mode-switching method according to an embodiment of the present invention.

FIG. 2 illustrates an example method 200 of adjusting the operating power of a wireless device according to an embodiment. At step 201, method 200 operates a wireless device in a normal operation mode. As may be appreciated, normal mode may refer to any operation mode of a wireless device that may not require a change in operation to accommodate a hearing aid device or the like.

At step 203, a HAC mode button press is detected. As was discussed above in connection with FIG. 1, a HAC mode button may be implemented in any number of ways, and it will be understood that use of the word "press" herein is for convenience, and does not require the actual physical pressing of a button. It will therefore be appreciated that activation of the HAC mode may occur in a variety of different ways. For example, and as was noted above in connection with FIG. 1, activation may occur by way of a button, softkey, RFID tag and reader and the like. In an embodiment using an RFID tag, a wireless device such as a telephone may read an RFID tag of the user's hearing aid (e.g., when the hearing aid is located in close proximity to an earpiece of the device) to determine that a HAC mode should be entered. The RFID tag may also include a value representing the power level of the HAC mode, or a user's hearing aid prescription from which the power level of the HAC mode may be determined. As may be appreciated, such an embodiment would allow a user to switch ears when using a cellular telephone without having to make any manual power adjustments, and would also allow multiple people to use the same telephone.

At step 205, the wireless device is switched to and operates in a HAC mode according to the button press. Switching the device into the HAC mode may involve more than one adjustment and an embodiment may therefore automate the process such that the single "press" detected in step 203 causes all of the necessary intermediate power level/state switching steps to be completed. As a result, a user need not know how to implement the HAC mode aside from the button "press" of step 203. Such a process may be automated using any type of hardware and/or software configuration such as, for example, a processor executing software that provides computer-readable instructions for such power level switching steps. In one embodiment, such computer-readable instructions may be stored on a computer-readable medium such as, for example, RAM, ROM, flash memory or the like.

The HAC mode itself may involve, for example, a reduction in power to an output power amplifier or the like to avoid interference with a hearing aid. The actual amount of power reduction may be according to a predetermined default, user selection, etc. In an embodiment involving RFID tags or other customizable method, the power level of the HAC mode may also be adjusted according to a detected hearing aid characteristic, value or setting, for example.

At step 207, a release of the HAC mode button is detected, and method 200 returns to a normal operation mode at step 201. The "release" of the button may, in one embodiment, simply be the literal release of a button such that the HAC mode is only used during a period of time when the user is physically depressing the button. Alternatively, the HAC mode may be entered by the first depression of a button and the depressing of the button a second time may signify a "release," indicating an end to the HAC mode period and triggering a return to normal mode. In an embodiment using one or more RFID tags, the "release" of the button may correspond to the hearing aid being removed from close proximity (i.e., detection distance) to an RFID tag reader of the wireless device. In alternate embodiments, step 207 may be effectuated by way of a predetermined event. For example, upon the HAC mode button press of step 203, a timer may be started that automatically returns the device to a normal operation mode once a predetermined time period ends. Alternatively, the HAC mode button press of step 203 may be configured to keep the device, if a telephone, in the HAC mode for the duration of a telephone call and, upon termination of the call connection, return the device to its normal operation mode. Thus, in these alternative embodiments, the HAC mode button "release" is accomplished by a timer or detection of a call termination, respectively. It will be appreciated that any method may be used to terminate period of time during which the wireless device operates in the HAC mode in connection with step 205 while remaining consistent with an embodiment.

Regardless of the actual devices used to implement method 200, it can be seen that an embodiment provides a trade-off between the high power and performance of a normal operation mode, which may also cause interference with a hearing aid, and a lower power HAC mode that may not provide as large a coverage area or call quality as the normal operation mode but reduces hearing aid interference. As a result, the HAC mode is used when it is needed, and normal operation may be provided as a default to enable the full range of features and service coverage that may be provided by the wireless device.

A device that is provided in accordance with an embodiment may, however, contain features that allow a user to modify or even override certain aspects of method 200 for purposes of satisfying users of varying preferences and requirements. For example, a particular user may find that he or she strongly prefers having a device that operates within the HAC mode, and is willing to tolerate the resulting loss of coverage area and/or signal strength that may result. Accordingly, a configuration option may be provided that allows the user to effectively "reverse" method 200 such that the device operates in the HAC mode by default, and a button press serves to temporarily switch the device into the normal operation mode.

A wireless device, such as a telephone, may be manufactured such that the ability to switch into the HAC mode can be selected by the user. For example, a wireless device manufacturer may wish to produce a single telephone that can be used by users having either normal or impaired hearing. A user with impaired hearing may simply access a menu or the like of such a telephone to activate an option to enable the HAC mode. Upon activating the option, the user may then perform step 203 according to the telephone's configuration. Alternatively, a user with normal hearing could simply use the telephone "as is," without activating the HAC mode feature. In embodiments using a softkey or the like to enable the HAC mode, the user with normal hearing could use the selection mechanism that would otherwise be used for selecting the HAC mode for other, unrelated functions.

Method 200 may also provide for exceptions to occur in the event of a call made to an emergency number, such as 911. For example, a user that normally has the device set to operate in the HAC mode may be willing to tolerate increased hearing aid interference during an emergency call because the user wants the increased coverage area provided by the power levels of the device's normal operation mode. Thus, a feature may be incorporated to detect that an emergency call is being made and then automatically switch the device to its normal operation mode. Conversely, a user may find that the interference caused by a device's normal operation mode is so severe that the user would prefer to use the HAC mode even for emergency calls.

In yet another alternate embodiment, a power mode may be selected according to the manner in which the wireless device is being operated. For example, if the device is being operated as a speaker phone (e.g., in an automobile or the like), the HAC mode may be disabled because the distance between the device and a user's hearing aid is large enough to minimize any interference. Accordingly, it should be appreciated that an embodiment permits a wireless device to contain any number and/or type of user-friendly features.

While the various embodiments have been described in connection with the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method comprising:
   detecting a beginning of a user action, wherein the user action is indicative of a first transmission power level at which to operate a component of a wireless device;
   responsive to detecting the user action, operating the component at the first transmission power level;
   detecting an end of the user action; and
   responsive to detecting the end of the user action, operating the component of the wireless device at a second transmission power level, wherein:
   the user action comprises reading a Radio Frequency Identification (RFID) tag associated with a user hearing assistance device, and
   the reading takes place when the RFID tag is placed in a location proximate to the wireless device which causes interference with the user hearing aid at the second transmission power level.

2. The method of claim 1, wherein the first transmission power level is a lower power level than the second transmission power level.

3. The method of claim 1, wherein said detecting the end of the user action occurs when the RFID tag associated with the user hearing aid is moved away from the wireless device to a location which does not cause interference with the user hearing aid at the second transmission power level.

4. The method of claim 1, wherein the component of the wireless device is an output power amplifier.

5. The method of claim 1, wherein said detecting the end of the user action comprises detecting an end of a predetermined time period.

6. The method of claim 1, wherein the wireless device is a telephone, and wherein said detecting the end of the user action comprises detecting an end of a telephone call connection.

7. A wireless device comprising:
   a selection mechanism for detecting a beginning of a user action indicating a first transmission power level; and
   an output power amplifier, wherein:
      the output power amplifier operates at the first transmission power level during a period associated with the user action;
      the output power amplifier maintains operation at the first transmission power level until an end of the period associated with the user action; and
      the output power amplifier operates at a second transmission power level upon the end of the period associated with the user action;
      the selection mechanism is a Radio Frequency Identification (RFID) tag reader that detects when an RFID tag associated with a user hearing aid is located in a location which causes interference with the user hearing aid at the second transmission power level proximate the wireless device.

8. The wireless device of claim 7, wherein the first transmission power level is a lower power level than the second transmission power level.

9. The wireless device of claim 7, wherein:
   the RFID tag includes a user hearing aid prescription; and
   the wireless device further comprises a processor for executing computer-readable instructions to determine the first transmission power level based on the hearing aid prescription.

10. The wireless device of claim 7, wherein the RFID tag associated with the user hearing aid indicates a value representing the first transmission power level.

11. The wireless device of claim 7, wherein the first transmission power level corresponds to a user hearing aid prescription or a user preference.

12. A computer-readable storage medium that is not a propagating signal, the computer-readable storage medium having computer-readable instructions for:
   detecting a beginning of a user action, wherein the user action is indicative of a first transmission power level at which to operate a component of a wireless device;
   responsive to detecting the user action, operating the component at the first transmission power level;
   detecting an end of the user action; and
   responsive to detecting the end of the user action, operating the component of the wireless device at a second transmission power level in response to the end of the user action, wherein:
      the user action comprises reading a Radio Frequency Identification (RFID) tag associated with a user hearing assistance device; and
      the reading takes place when the RFID tag associated with the user hearing aid is placed in a location proximate the wireless device which causes interference with the user hearing aid at the second transmission power level.

13. The computer-readable medium of claim 12, wherein the first transmission power level is a lower power level than the second transmission power level.

14. The computer-readable medium of claim 12, wherein said detecting the end of the user action occurs when the RFID tag associated with the user hearing aid is moved away from the wireless device to a location which does not cause interference with the user hearing aid at the second transmission power level.

15. The computer-readable medium of claim 12, wherein the component of the wireless device is an output power amplifier.

16. The computer-readable medium of claim 12, wherein said detecting the end of the user action comprises detecting an end of a predetermined time period.

17. The computer-readable medium of claim 12, wherein the wireless device is a telephone, and wherein said detecting the end of the user action comprises detecting an end of a telephone call connection.

\* \* \* \* \*

UNITED STATES PATENT AND TRADEMARK OFFICE
CERTIFICATE OF CORRECTION

| | | |
|---|---|---|
| PATENT NO. | : 8,606,333 B2 | Page 1 of 1 |
| APPLICATION NO. | : 11/450243 | |
| DATED | : December 10, 2013 | |
| INVENTOR(S) | : Frerking et al. | |

It is certified that error appears in the above-identified patent and that said Letters Patent is hereby corrected as shown below:

In the Claims

<u>Column 7</u>,
Claim 7,
Line 28, delete "and".
Line 31, after "action;" insert -- and --.

Signed and Sealed this
Twenty-sixth Day of August, 2014

Michelle K. Lee
*Deputy Director of the United States Patent and Trademark Office*